(12) United States Patent
Akiyoshi

(10) Patent No.: US 10,585,519 B2
(45) Date of Patent: Mar. 10, 2020

(54) INFORMATION PROCESSING APPARATUS AND CONTROL METHOD THEREOF

(71) Applicant: CANON KABUSHIKI KAISHA, Tokyo (JP)

(72) Inventor: Hidenobu Akiyoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 15/484,301

(22) Filed: Apr. 11, 2017

(65) Prior Publication Data

US 2017/0300159 A1 Oct. 19, 2017

(30) Foreign Application Priority Data

Apr. 14, 2016 (JP) ................. 2016-081074

(51) Int. Cl.
  *G06F 21/32* (2013.01)
  *G06F 3/041* (2006.01)
  *G06F 3/0488* (2013.01)
  *G06F 21/31* (2013.01)

(52) U.S. Cl.
  CPC .......... *G06F 3/0414* (2013.01); *G06F 3/0416* (2013.01); *G06F 3/04886* (2013.01); *G06F 21/31* (2013.01); *G06F 21/32* (2013.01)

(58) Field of Classification Search
  CPC ...... G06F 21/31; G06F 3/03547; G06F 3/041; G06F 3/0414; G06F 3/0416; G06F 3/04886
  See application file for complete search history.

(56) References Cited

U.S. PATENT DOCUMENTS

| 9,710,627 B2* | 7/2017 | Parsons .............. G06F 21/31 |
| 9,723,000 B1* | 8/2017 | Daniel .............. H04L 63/0861 |
| 2011/0050394 A1 | 3/2011 | Zhang et al. |

(Continued)

FOREIGN PATENT DOCUMENTS

| CN | 102722283 A | 10/2012 |
| CN | 105046122 A | 11/2015 |

(Continued)

OTHER PUBLICATIONS

The above foreign patent documents #1-6 and the U.S. Patent Publication documents #1-2 were cited in the Sep. 19, 2017 Great Britain Office Action, that issued in Great Britain Patent Application No. 1705488.3.

*Primary Examiner* — Amir Mehrmanesh
(74) *Attorney, Agent, or Firm* — Cowan, Liebowitz & Latman, P.C.

(57) ABSTRACT

During a touch operation for setting authentication information, authentication information is generated based on data input in accordance with a touch position of a touch operation performed on a touch panel and touch pressure applied to the touch panel by the touch operation. At the time of accepting a touch operation for unlocking an information processing apparatus, a combination of data input in accordance with a touch position of a touch operation performed on a touch panel and touch pressure applied to the touch panel by the touch operation are compared with authentication information. When a result of the comparison is a match, the information processing apparatus is unlocked and execution of various functions is allowed.

15 Claims, 6 Drawing Sheets

(56) References Cited

U.S. PATENT DOCUMENTS

| | | | | |
|---|---|---|---|---|
| 2012/0192268 | A1* | 7/2012 | Wang | G06F 21/36 726/19 |
| 2013/0347101 | A1 | 12/2013 | Wu | |
| 2017/0032114 | A1* | 2/2017 | Turgeman | G06F 21/32 |
| 2017/0084104 | A1* | 3/2017 | Lu | E05B 17/226 |
| 2018/0225438 | A1* | 8/2018 | Hama | G06F 21/32 |

FOREIGN PATENT DOCUMENTS

| | | |
|---|---|---|
| JP | 2015-111387 A | 6/2015 |
| KR | 1020090130784 A | 12/2009 |
| KR | 1020100011084 A | 2/2010 |
| KR | 1020140056954 A | 5/2014 |
| KR | 1020150018028 A | 2/2015 |

\* cited by examiner

INFORMATION PROCESSING APPARATUS AND CONTROL METHOD THEREOF

BACKGROUND OF THE INVENTION

Field of the Invention

The present invention relates to an information processing apparatus, a control method thereof, and a program.

Description of the Related Art

Setting a password on a device helps to prevent a third party from using the device. In this method, a user sets, in advance, a combination of a plurality of characters as a password. In a known technique, the user is asked to input the password using a touch panel or the like at the start of use of a device, a determination is made on whether or not an input character string and a password set in advance match each other, and the device is unlocked and use thereof is allowed in case of a match (refer to Japanese Patent Application Laid-open No. 2015-111387).

Besides passwords, there is a technique which uses a pattern of touched positions and an order in which the touched positions are passed during consecutive touch operations to a screen. In this case, at the start of use of a device, the device is unlocked in a case where the touched positions and the order thereof on a touch panel match a pattern set in advance.

SUMMARY OF THE INVENTION

However, for example, in a case where a third party sees the user inputting a password or a pattern, there is a risk that the password or the pattern may be easily found out and the device may be used by the third party. On the other hand, increasing the number of characters required by passwords or making patterns more complex in order to enhance security increases the burden on user and impairs convenience.

The apparatus and method as follows retain simplicity so that a user may use easily memorable character combinations and unlocking patterns while enhancing security.

A first aspect of the present invention is an information processing apparatus, including:

a display control unit configured to control to perform displaying data on a display device having a touch screen;

an acquiring unit configured to acquire authentication information including a combination of data and information on pressure applied to the touch screen by a touch operation for inputting the data;

a detecting unit configured to detect a position and pressure of a touch operation on the touch screen;

a comparing unit configured to compare the acquired authentication information with a combination of data displayed at a position of a login touch operation detected by the detecting unit and information on pressure applied to the touch screen by the login touch operation; and an execution control unit configured to control to selectively allow execution of functions in accordance with a result of the comparison.

A second aspect of the present invention is a control method for an information processing apparatus, the method including the steps of:

controlling to perform displaying data on a display device having a touch screen;

acquiring authentication information including a combination of data and information on pressure applied to the touch screen by a touch operation for inputting the data;

detecting a position and pressure of the touch operation on the touch screen;

comparing the acquired authentication information with a combination of data displayed at a detected position of a login touch operation and information on pressure applied to the touch screen by the login touch operation; and performing control to selectively allow execution of functions in accordance with a result of the comparison.

The apparatus and method retain simplicity so that a user may use easily memorable character combinations and patterns while enhancing security.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. Each of the embodiments of the present invention described below can be implemented solely or as a combination of a plurality of the embodiments or features thereof where necessary or where the combination of elements or features from individual embodiments in a single embodiment is beneficial.

(First Embodiment)

Figure 1:
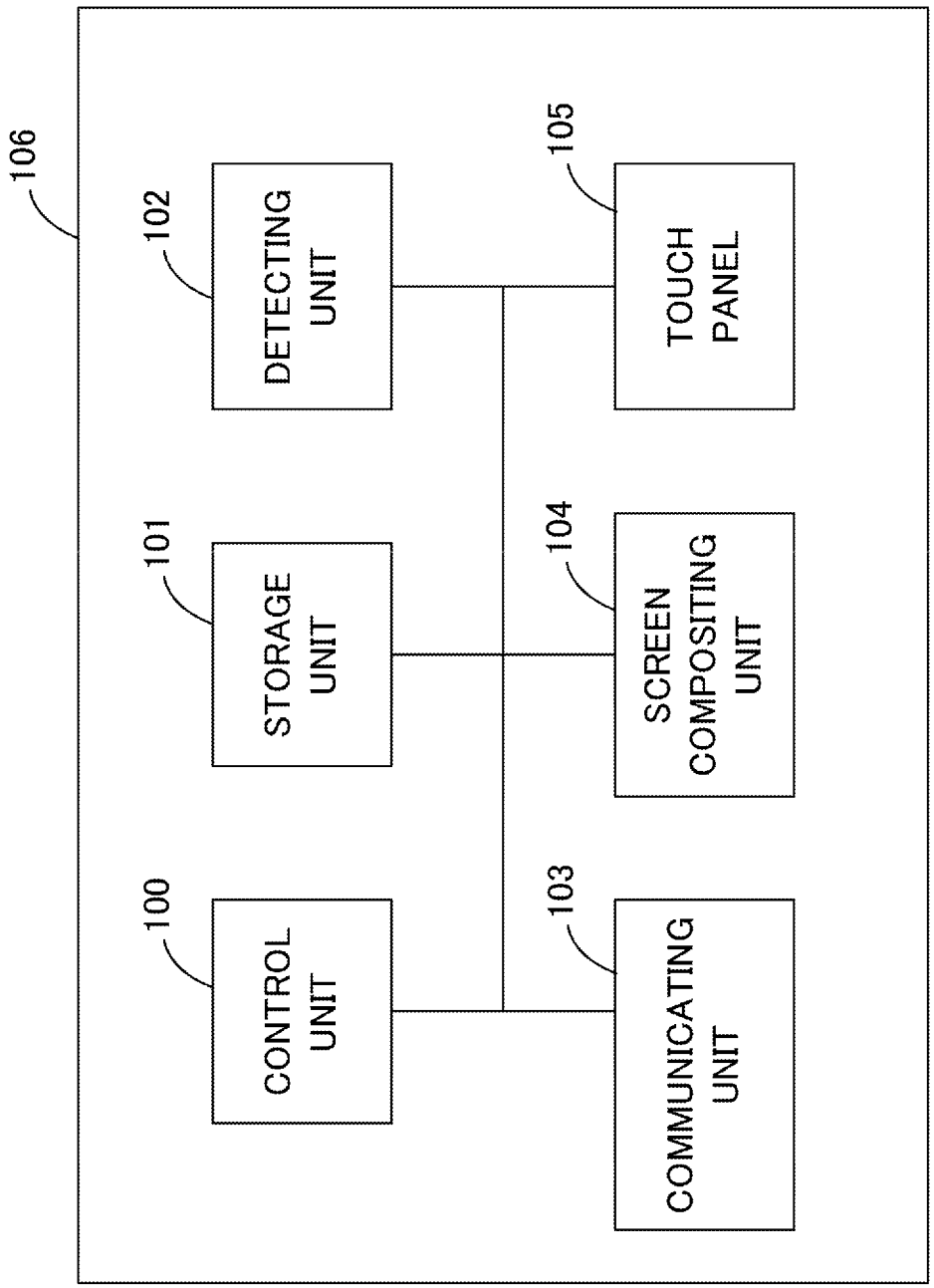
FIG. 1 is a diagram showing an example of a configuration of a smartphone according to an embodiment of the present invention.

FIG. 1 is a diagram showing a functional configuration of a smartphone according to a first embodiment to which an information processing apparatus according to the present invention is applied. First, each component will be described.

A control unit 100 controls operations of an entire smartphone 106. The control unit 100 executes various processes to be described later by executing an application (program) stored in a storage unit 101. The storage unit 101 is a memory for storing authentication information such as a password or an unlocking pattern input by a user. The storage unit 101 stores a program to be run on the smartphone 106.

A detecting unit 102 is a sensor which detects touch pressure (intensity of contact made with a touch panel) during a touch operation of the user on the touch panel 105 and which outputs the detected touch pressure as a pressure level. In a case where contact is made to a touch screen of the touch panel 105, the detecting unit 102 measures a size and/or a change thereof of a contact region which is detected on the touch screen. Alternatively, capacitance and/or a change thereof of the touch screen in a vicinity of a contact position or resistance and/or a change thereof of the touch screen in a vicinity of a contact position are measured. Subsequently, a pressure level is detected based on such measurement values. Moreover, a method of measuring touch pressure on the touch panel 105 is not limited to the above. Various touch pressure detecting techniques can be used. A communicating unit 103 is an interface for communicating with an external apparatus or a server. An example of the server is a server which manages authentication information.

A screen compositing unit 104 composites data of image parts constituting a graphical user interface (GUI) of an application executed by the control unit 100 and image data such as photographs, and generates display data to be displayed by the touch panel 105. The touch panel 105 is an interface constituted by a display device which performs image display based on display data output by the screen compositing unit 104 and a touch sensor which detects a touch operation on the touch screen by the user. The touch sensor detects coordinates in XY directions of a touch position of the touch operation and outputs a detection result to be processed by the control unit 100 and the like. The touch panel 105 is an input unit for accepting a touch operation for inputting authentication information to be used in an unlocking process at the start of use of the smartphone 106.

Figure 2B:
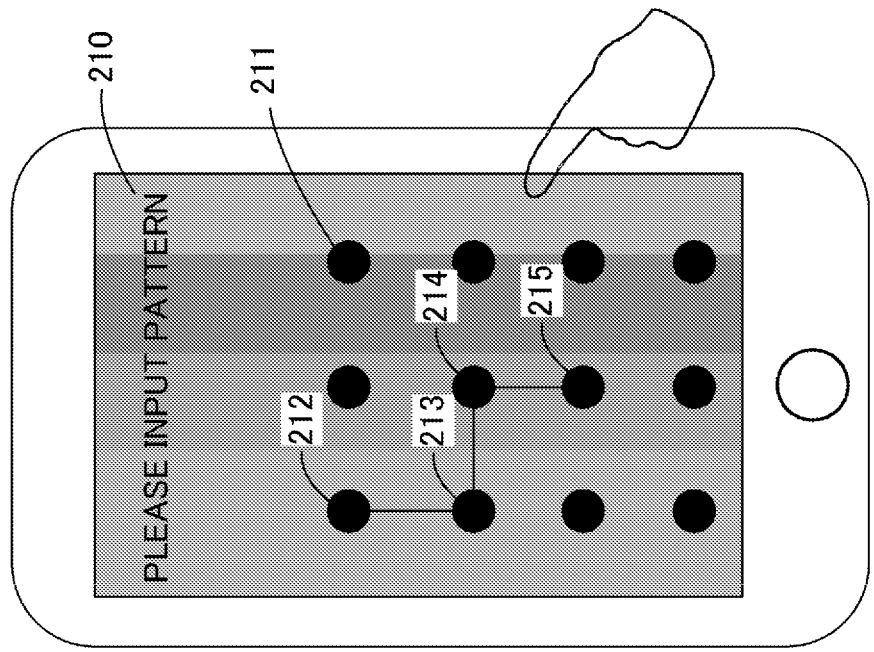
FIGS. 2A and 2B are diagrams showing an example of an authentication information setting screen according to the embodiment of the present invention.
Figure 2A:
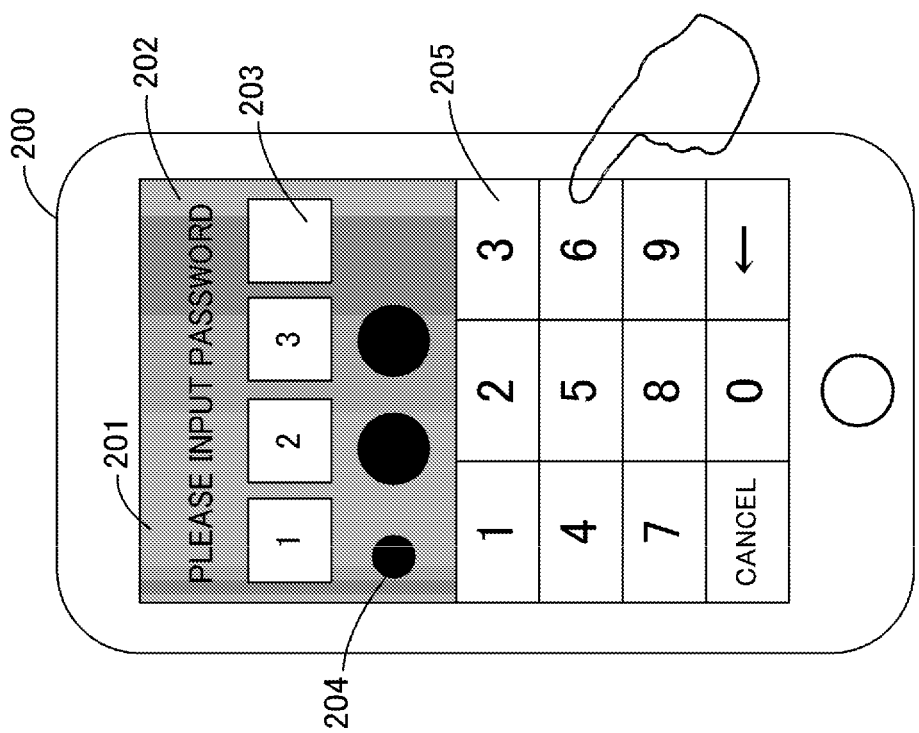

FIG. 2 is a diagram showing an example of an authentication information setting screen which is displayed on the touch panel of the smartphone 106 according to the first embodiment in a case where setting authentication information for unlocking the smartphone 106. FIG. 2A shows an example of a screen for setting a four-digit numeral as a password, and FIG. 2B shows an example of a screen for setting touch positions (coordinates) having been touched by consecutive touch operations and a touch sequence of the touch operations as an unlocking pattern.

In FIG. 2A, on a housing 200 of the smartphone, a password setting screen 201 is displayed on the touch panel 105. An explanatory note 202, a password input field 203, and a virtual keyboard 205 are displayed on the password setting screen. While a case where the virtual keyboard has numerical keys of 0 to 9 is shown as an example, the virtual keyboard may have other types of characters such as hiragana, katakana, the alphabet, emoji, and symbols. In addition, an arrangement of characters on the virtual keyboard 205 need not necessarily be fixed. Alternatively, display may be switched for each character type or, every time a same character type is displayed, characters may be displayed randomly in a different arrangement. A case where authentication information is a pattern will be described later.

Pressure level information 204 visually indicates a pressure level during a touch operation detected by the detecting unit 102. The example shown in FIG. 2A is a case where the user touches "1", "2", and "3" of the virtual keyboard 205 in this order, and the pressure level information 204 expresses a pressure level detected by the detecting unit 102 during each touch by an area of a circle. In the example shown in FIG. 2A, pressure levels are detected in two stages ("low" and "high"). FIG. 2A shows that pressure levels when "1", "2", and "3" are touched are, respectively, "low", "high", and "high". Moreover, "high" is detected in a case where the pressure level is higher than a prescribed reference value and "low" is detected in a case where the pressure level is lower. In addition, while an example in which pressure levels are determined in two stages of "high" and "low" is described in the present embodiment, a larger number of pressure levels may be determined. As described above, in a case where the control unit 100 accepts a touch operation on the password setting screen 201, the control unit 100 causes information related to a pressure level corresponding to a measurement value of touch pressure detected by the detecting unit 102 to be displayed on the touch panel 105. In this case, as information related to a pressure level, the control unit 100 causes a prescribed graphic (in this case, a circle) having an area in accordance with the pressure level to be displayed on the touch panel 105. Alternatively, a password input field or input characters may be displayed by changing colors thereof in accordance with a magnitude of the pressure level. Accordingly, during performing a touch input for setting a password, the user can readily comprehend how much pressure is applied by the touch operation being performed by the user. Alternatively, the smartphone 106 may include a vibrating unit and, in order to notify the user of a pressure level of a touch operation, the control unit 100 may control the smartphone 106 so as to vibrate in accordance with a measurement value detected by the detecting unit 102 in a case where a touch operation is accepted on the password setting screen 201. For example, the smartphone 106 may be configured to vibrate in a case where the measurement value is the "high" pressure level but not to vibrate in a case where the measurement value is the "low" pressure level.

The virtual keyboard 205 is a GUI for inputting characters which is displayed on the password setting screen 201 and, in the example shown in FIG. 2A, the virtual keyboard 205 is a keyboard for inputting numerals. The virtual keyboard may be changeable to those of variable types such as an alphabetical keyboard.

Next, a case of setting an unlocking pattern will be described with reference to FIG. 2B. In FIG. 2B, on the housing 200 of the smartphone, a pattern setting screen is displayed on the touch panel 105. While maintaining touch on this screen, the user performs a drag operation so as to draw a trajectory of a broken line which consecutively passes through desired positions (dots) among a plurality of positions indicated by dots 211. Accordingly, a pattern constituted by the positions of the plurality of dots touched during a series of drag operations and a sequence in which the plurality of positions are touched is registered as an unlocking pattern. In the example shown in FIG. 2B, the user traces dots with a finger in an order of dots 212→213→214→215 and, accordingly, a pattern of positions and a sequence indicated by a broken line connecting the four dots is adopted as an unlocking pattern. At this point, the detecting unit 102 associates a pressure level corresponding to a measurement value of touch pressure during the touch operation of each dot with information on a combination of a touch position and a sequence, and stores the associated information as authentication information in the storage unit 101. While the present embodiment describes a case where a plurality of dots are displayed as indicators of user input on the pattern setting screen, other graphic or symbols may be displayed in place of the dots.

Moreover, a pressure level corresponding to a measurement value detected by the detecting unit 102 during a touch operation may also be visually displayed on the unlocking pattern setting screen. The control unit 100 determines the pressure level in a case where the user performs a drag operation and passes dots in two stages ("low" and "high"). In addition, as information related to a pressure level, the control unit 100 causes a dot to be displayed so as to have an area in accordance with the pressure level. Alternatively, a magnitude of a pressure level may be made identifiable by displaying a dot in a different color in accordance with the pressure level. Accordingly, during inputting a pattern, the user can readily comprehend how much pressure is applied by the touch operation being performed by the user. Alternatively, in order to notify the user of pressure applied by a touch operation, the smartphone 106 may include a vibrating unit and the control unit 100 may control the smartphone 106 so as to vibrate in accordance with a determined pressure level in a case where a touch operation is accepted on the unlocking pattern setting screen 210. For example, the smartphone 106 may be configured to vibrate in a case where the pressure level is "high" but not to vibrate in a case where the pressure level is "low".

In a case where this unlocking pattern is used, upon authentication, the user performs a drag operation while maintaining touch on the touch panel 105 and sequentially touches dots displayed on the screen. Subsequently, unlocking is performed in a case where a combination of a pattern of positions and a sequence of the dots touched upon authentication and pressure levels applied when the dots are touched matches a registered combination of a pattern and pressure levels of respective dots.

Figure 5:
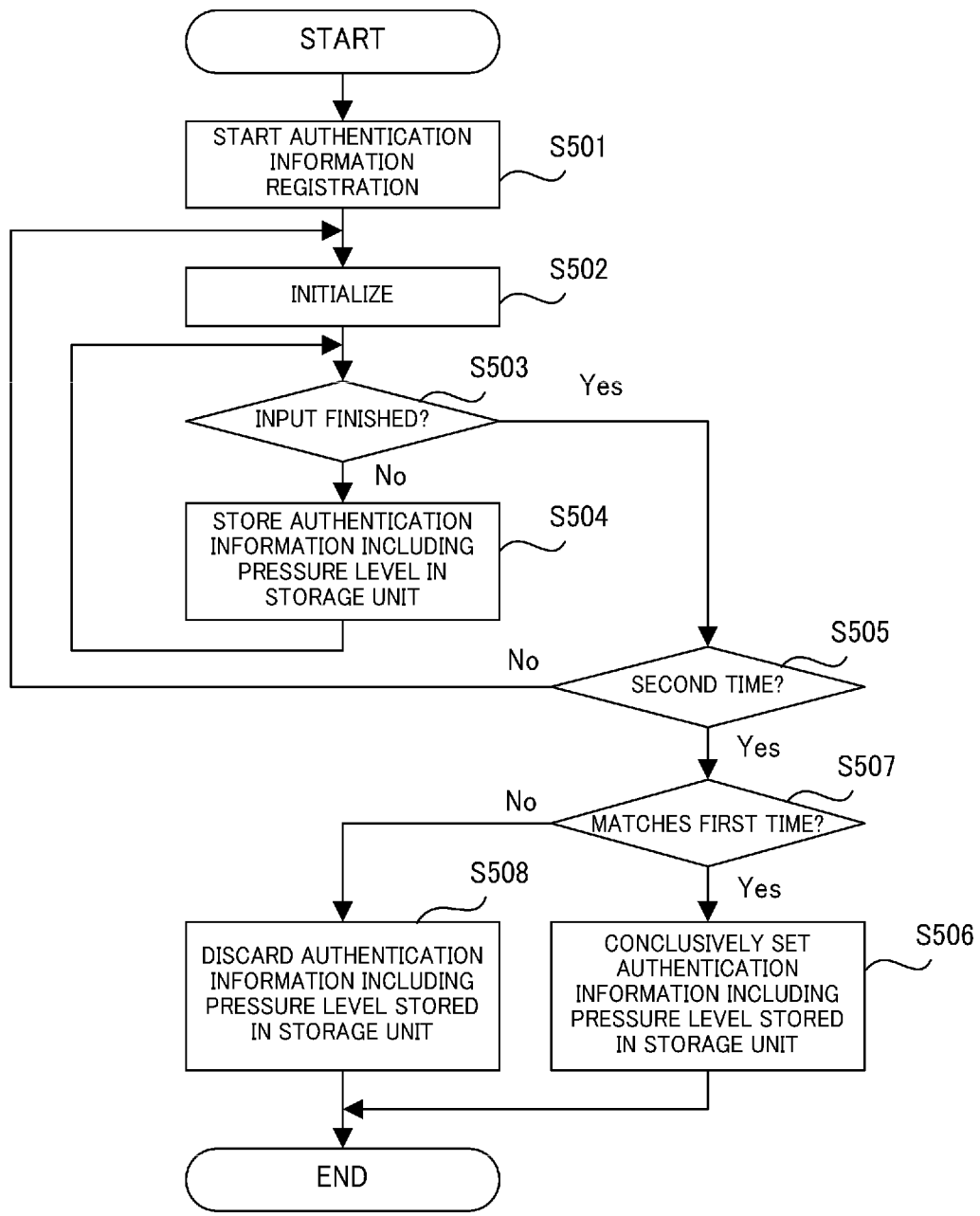
FIG. 5 is a flow chart showing an example of a registration process of authentication information according to the embodiment of the present invention.

Next, a process in a case where authentication information is set to the smartphone 106 according to the first embodiment will be described using the flow chart shown in FIG. 5.

First, an authentication information setting process in a case of setting a password for unlocking the smartphone 106 will be described.

In step S501, the control unit 100 starts a password registration process. The control unit 100 reads an application for setting passwords from the storage unit 101 and executes the application. The screen compositing unit 104 creates data of a password setting screen and outputs the data to the touch panel 105. Accordingly, a password setting screen such as that shown in FIG. 2A is displayed on the touch panel 105.

In step S502, in a case where a value is already input to the password input field 203, the control unit 100 erases the value and initializes a password input position to a first digit.

In step S503, the control unit 100 determines whether or not input of all digits of a password has been finished. In the present embodiment, the total number of digits is four. The process advances to step S504 in a case where input of all four digits of the password has not been finished but advances to step S505 in a case where input has been finished.

In step S504, the user performs an operation of touching a position of a key displaying a desired character of the virtual keyboard 205 displayed on the touch panel 105. Based on a touch position detected by the touch panel 105, the control unit 100 determines a touched numeral and stores information on the numeral in the storage unit 101. At the same time, the control unit 100 acquires a pressure level during the touch operation as detected by the detecting unit 102, associates the pressure level with the information on the touched numeral, and stores the associated information in the storage unit 101 as authentication information. In this manner, for each character constituting a password, the control unit 100 generates authentication information by associating the character with the pressure level when the touch operation for inputting the character had been performed.

The control unit 100 repeats the processes of steps S503 and S504 until input of all four digits of a password is finished. Accordingly, in the example shown in FIG. 2A, each time the user performs a touch operation of "1", "2", and "3" of the virtual keyboard 205, information on a touched numeral and information on a pressure level detected by the detecting unit 102 are associated with each other and stored in the storage unit 101. As described earlier, the control unit 100 determines pressure levels in the two stages of "high" and "low". The control unit 100 acquires a reference value used to determine pressure levels from the storage unit 101 and compares the reference value and a measurement value of the detecting unit 102 with each other to determine which of the pressure levels "high" and "low" the measurement value corresponds to.

In step S505, the control unit 100 performs an input confirmation process of a password. Specifically, the control unit 100 asks the user to input the password twice to avoid a situation where a password which differs from an intended password is registered. The control unit 100 reads an application for password registration from the storage unit 101 and executes the application so that the processes of steps S502 to S504 are repeated twice. Once two password input operations are finished, the control unit 100 advances to step S507. In a case where only the first password input operation is finished, the control unit 100 returns to step S502 to perform the second password input operation.

In step S507, the control unit 100 determines whether or not the password input for the first time and a pressure level of each character match the password input for the second time and a pressure level of each character. The control unit 100 advances to step S506 in the case of a match but advances to step S508 in the case of a mismatch.

In step S506, the control unit 100 stores a combination of the input password and pressure levels of the respective characters in the storage unit 101 in order to conclusively register the combination as authentication information. The control unit 100 generates password information based on touch operations performed on the password setting screen 201. In FIG. 2A, the control unit 100 associates information regarding a touch position detected on the touch panel 105 when a touch operation is performed on the password setting screen 201 and information regarding a pressure level of the touch operation with each other to generate authentication information, and stores the authentication information in the storage unit 101. In the example shown in FIG. 2A, information regarding a touch position refers to data (a character (such as "1" and "2")) displayed at a touch position corresponding to the virtual keyboard on the touch panel 105. In addition, for each character constituting a password, the control unit 100 generates authentication information by associating the character with the pressure level when a touch operation for inputting the character was performed and stores the authentication information in the storage unit 101.

In step S508, the control unit 100 discards passwords, including pressure levels, that have been respectively input for the first and second times from the storage unit 101 and ends the password setting process. Alternatively, instead of ending the password setting process, a message to the effect that the second input password does not match may be displayed on the screen and a return may be made to step S501 to once again execute the password setting process from the beginning.

The control unit 100 may transmit, using the communicating unit 103, information on an input password including pressure levels to an external server which manages authentication information to have the information stored in the server.

Next, an authentication information setting process in a case of setting an unlocking pattern for unlocking the smartphone 106 will be described using the flow chart shown in FIG. 5.

The control unit 100 starts a pattern registration process (S501). The control unit 100 reads an application for setting patterns from the storage unit 101 and executes the application. The screen compositing unit 104 creates data of a pattern setting screen and outputs the data to the touch panel 105. Accordingly, a pattern setting screen such as that shown in FIG. 2B is displayed on the touch panel 105. In addition, in a case where a pattern has already been input in a pattern input field, the control unit 100 erases the pattern and initializes the pattern input field (S502).

The control unit 100 determines whether or not input of a pattern has been finished (S503). In a case where a touch off state is detected after detecting a touch on state, input of a pattern is determined to be finished. In a case where input of the pattern has not been finished (No in S503), the process advances to step S504. In a case where input has been finished (Yes in S503), the process advances to step S505.

The user performs an operation of consecutively touching dots displayed on the touch panel 105. Based on touch positions detected by the touch panel 105, the control unit 100 sequentially determines touched dots and stores information on positions of the dots on which touch operations have been performed and a sequence of the positions in the storage unit 101. In addition, at the same time, the control unit 100 acquires a pressure level based on a measurement value of touch pressure applied during the touch operation of each dot as detected by the detecting unit 102, associates the pressure level with the information on the position and a sequence of each dot, and stores the associated information in the storage unit 101 as authentication information. In this manner, for each position and a sequence of a dot constituting a pattern, the control unit 100 generates authentication information by associating the dot with the pressure level applied when the touch operation had been performed.

The control unit 100 repeats the processes of steps S503 and S504 until input of a pattern is finished. Accordingly, in the example shown in FIG. 2B, each time the user sequentially performs consecutive touch operations of dots 212, 213, 214, and 215, information on positions of the touched dots and information on pressure levels of the touch operations on the touch screen are associated with each other and stored in the storage unit 101. As described earlier, the control unit 100 determines pressure levels in the two stages of "high" and "low". The control unit 100 acquires a reference value to be used to determine pressure levels from the storage unit 101 and compares the reference value and a measurement value of the detecting unit 102 with each other to determine which of the pressure levels "high" and "low" the measurement value corresponds to.

In step S505, the control unit 100 performs an input confirmation process of an unlocking pattern. Specifically, the control unit 100 asks the user to input the unlocking pattern twice to avoid a situation where an unlocking pattern which differs from an intended unlocking pattern is registered. Once two pattern input operations are finished, the control unit 100 advances to step S507. In a case where only the first pattern input operation is finished, the control unit 100 returns to step S502 to perform the second pattern input operation.

In step S507, the control unit 100 determines whether or not the pattern input for the first time and a pressure level of each dot match the pattern input for the second time and a pressure level of each dot. The control unit 100 advances to step S506 in the case of a match but advances to step S508 in the case of a mismatch.

In step S506, the control unit 100 stores a combination of the input pattern and pressure levels of the respective dots in the storage unit 101 in order to conclusively register the combination as authentication information. The control unit 100 generates password information based on touch operations performed on the pattern setting screen. In the example shown in FIG. 2B, the control unit 100 associates information regarding a touch position detected on the touch panel 105 when a touch operation is performed on the pattern setting screen and a pressure level indicating a magnitude of pressure applied to the touch panel 105 with each other to generate authentication information. In addition, the control unit 100 stores the authentication information in the storage unit 101. In the example shown in FIG. 2B, information regarding a touch position refers to information on a touch position corresponding to a touched dot. Furthermore, for each touched dot, the control unit 100 generates authentication information by associating the dot with the pressure level when the touch operation was performed, and causes the authentication information to be stored in the storage unit 101.

In step S508, the control unit 100 discards patterns, including pressure levels having been respectively input for the first and second times from the storage unit 101 and ends the authentication information setting process. Alternatively, instead of ending the authentication information setting process, a message to the effect that the second input pattern does not match the first input pattern may be displayed on the screen and a return may be made to step S501 to once again execute the pattern setting process from the beginning.

The control unit 100 may transmit, using the communicating unit 103, information on an input unlocking pattern including pressure levels to an external server which manages authentication information to have the information stored in the server.

Next, a method of determining a pressure level will be described. With the smartphone 106 according to the first embodiment, a reference value of a measurement value of the detecting unit 102 is stored in the storage unit 101 in advance and, each time the user performs a touch operation on the touch panel 105, the control unit 100 compares a measurement value of the detecting unit 102 and the reference value with each other. A specific example is shown in FIG. 3A.

Figure 3A:
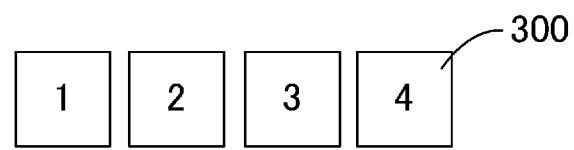
FIGS. 3A and 3B are diagrams explaining an example of a method of detecting a pressure level according to the embodiment of the present invention.
Figure 3A:
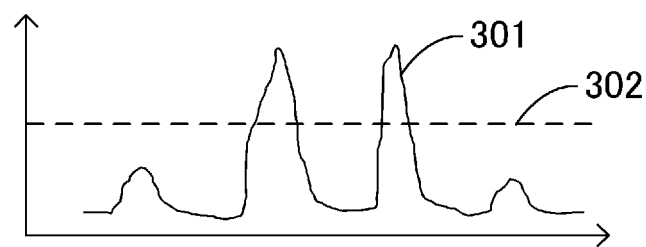

In FIG. 3A, a dashed line 302 indicates a reference value and a curved line 301 indicates a measurement value measured by the detecting unit 102. Each time the user performs a touch operation on the touch panel 105, the control unit 100 compares a measurement value of the detecting unit 102 and the reference value with each other, determines that a pressure level is "high" in a case where the measurement value is equal to or greater than the reference value, and determines that the pressure level is "low" in a case where the measurement value is smaller than the reference value. The detecting unit 102 determines a pressure level by comparing a maximum value of measurement values obtained in a period from the moment a finger of the user touches on the touch panel 105 until the moment the finger touches off during one touch operation with the reference value.

As shown in FIG. 3A, in a case where a change in measurement values of the detecting unit 102 in a process of inputting a four-digit password is as indicated by the curved line 301, a determination result of pressure levels is "low", "high", "high", and "low". The determination of levels of touch pressure can be performed in a similar manner in a case where a pattern is set as a password as shown in FIG. 2B. In this case, the control unit 100 determines a pressure level by comparing a measurement value of touch pressure as measured by the detecting unit 102 with a prescribed reference value. In addition, positions of a plurality of dots passed by touch operations on the pattern setting screen shown in FIG. 2B, a sequence in which each dot had been touched, and a level of touch pressure when a touch operation had been performed at each position are associated with each other to generate password related information, and the password related information is stored in the storage unit 101.

Figure 6:
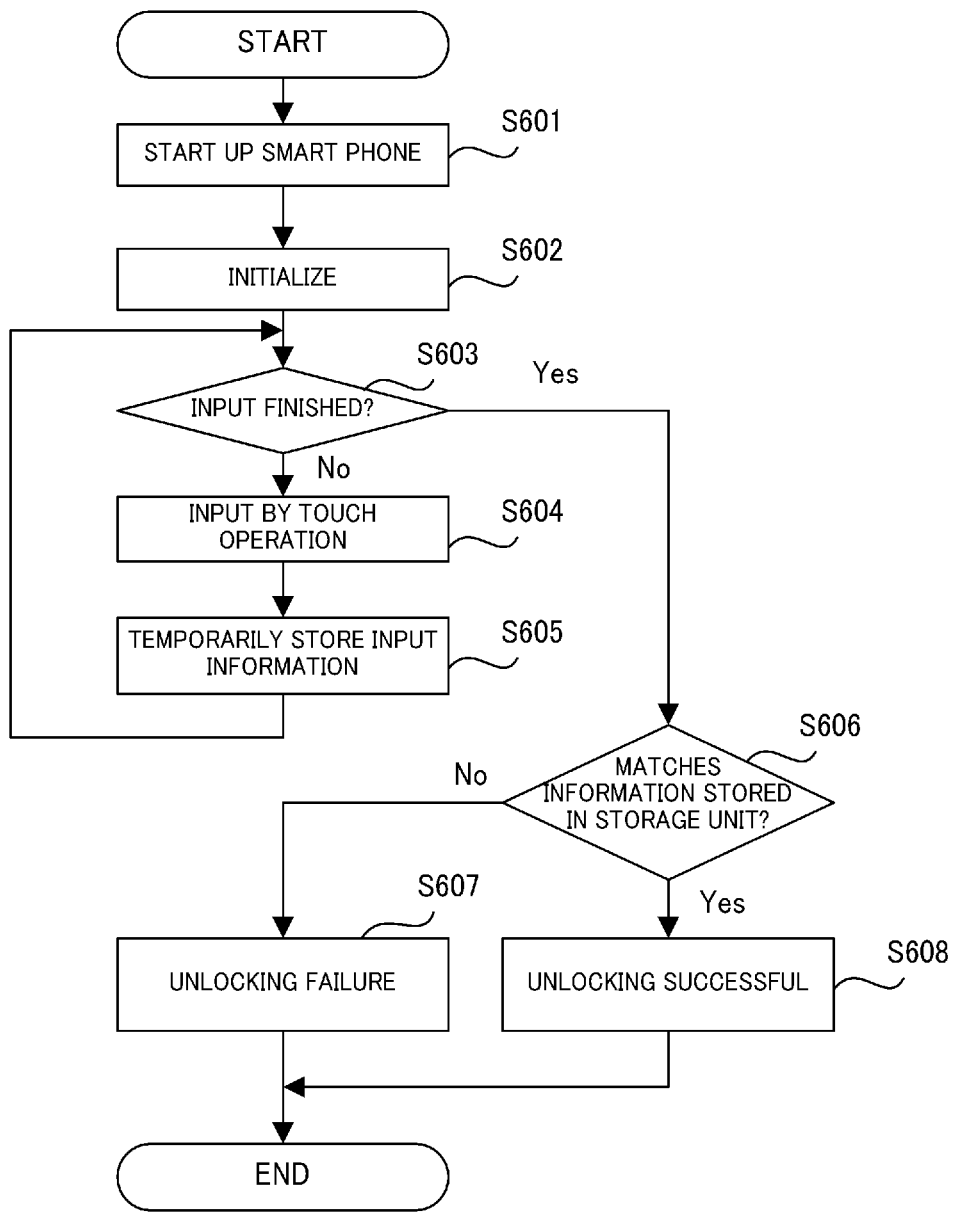
FIG. 6 is a flow chart showing an example of an unlocking process according to the embodiment of the present invention.

Next, a process in a case where a password is input to unlock the smartphone 106 at the start of use of the smartphone 106 will be described with reference to FIG. 6.

In step S601, upon the user's starting the smartphone 106 to use the smartphone 106, the control unit 100 runs a password authentication process. The control unit 100 reads an application for password authentication from the storage unit 101 and executes the application. The screen compositing unit 104 creates data of a password authentication screen and outputs the data to the touch panel 105. On the password authentication screen displayed at this point, the password input field 203 and the virtual keyboard 205 are displayed in a similar manner to FIG. 2A. However, the pressure level information 204 is not displayed on the password authentication screen. Accordingly, even in a case where a third party sees the user operating the smartphone 106 to unlock the smartphone 106, the third party is unable to see how strongly each key is being touched. Therefore, the possibility of a password being found out by a third party is reduced and security can be enhanced. Alternatively, in a similar manner to the authentication information setting process, in order to notify the user of a pressure level of a touch operation, the control unit 100 may cause the smartphone 106 to vibrate in accordance with a pressure level when a touch operation is accepted. Since the vibration is not transmitted to a third party not holding the smartphone, the possibility of the third party learning a pressure level is reduced and security can be enhanced.

In step S602, in a case where a value is already input to the password input field 203, the control unit 100 erases the value and initializes a password input position to a first digit.

In step S603, the control unit 100 determines whether or not input of all digits of a password has been finished. In the present embodiment, the total number of digits is four. The process advances to step S606 in a case where input of all four digits of the password has been finished but advances to step S604 in a case where input has not been finished.

In step S604, the user performs a touch operation on a key of a desired numeral of the virtual keyboard 205 displayed on the touch panel 105 and, in response thereto, the control unit 100 determines the touched numeral based on a touch position detected by the touch panel 105. In addition, at the same time, the control unit 100 acquires a pressure level during the touch operation as detected by the detecting unit 102, associates the pressure level with the information on the determined numeral, and stores the associated information in the storage unit 101 as input information (S605).

In step S606, the control unit 100 acquires the authentication information conclusively registered in the password registration process described earlier from the storage unit 101 and compares a combination of a character string and a pressure level of each character of the password information stored in step S605 with the authentication information. In a case where the information matches, the control unit 100 advances to step S608 to unlock the smartphone 106 and allow functions included in the smartphone 106 to be executed. In a case where the information does not match, the control unit 100 advances to step S607 to perform an unlocking failure process of displaying a message to the effect that password authentication has failed on the touch panel 105 or the like. At this point, a return may be made to step S602 to once again perform a password input process. In addition, in a case where authentication fails a prescribed number of times, further input of a password may be rejected. Moreover, in a case where a pressure level of each character does not match but a character string matches in the input of a password, input of a password may be continuously accepted even if the number of authentication failures exceeds the prescribed number of times. Furthermore, in a case where a pressure level of each character does not match but a character string matches in the input of a password, whether an erroneously input pressure level is "high" or "low" may be displayed in step S608. Accordingly, the user can more easily perform a correct input by referring to the pressure level determined upon the erroneous input and adjusting strength of a touch operation on the touch screen accordingly. Alternatively, a second password not associated with pressure levels may be further set as authentication information, and in a case where a pressure level of each character does not match but a character string matches in the input of a password, input of a character string by a new touch operation may be accepted and the character string may be collated with the second password. In this case, the second password has a larger data amount than a password associated with pressure levels and is expressed by, for example, a character string with a larger number of digits. If the second password is entered correctly, the control unit 100 unlocks the smartphone 106 and allows functions included in the smartphone 106 to be executed.

As described above, in the unlocking process according to the first embodiment, the control unit 100 performs authentication using authentication information including information regarding a character string and touch pressure applied in the input of each character by a touch operation. In addition, authentication is determined to be successful in a case where a character string and touch pressure applied in the input of each character by a touch operation for unlocking match the character string and the touch pressure of each character included in the authentication information.

When performing password authentication using the virtual keyboard 205 as shown in FIG. 2A, password information includes information on a prescribed number of characters and includes information on a pressure level associated with each of the characters as information regarding touch pressure. The control unit 100 determines that authentication is successful in a case where a prescribed number of characters input using the virtual keyboard 205 and a pressure level applied in the input of each character respectively match the prescribed number of characters and the pressure level associated with each of the characters included in the password information.

Next, an unlocking process in which a pattern of touch positions and a sequence are used will be described.

Upon the user's starting the smartphone 106 to use the smartphone 106, the control unit 100 runs a password authentication process (S601). The control unit 100 reads an application for password authentication from the storage unit 101 and executes the application. The screen compositing unit 104 creates data of a password authentication screen and outputs the data to the touch panel 105. When using a pattern as a password, the control unit 100 causes a password authentication screen to be displayed on the touch panel 105. On the password authentication screen displayed at this point, dots 211 are displayed in a similar manner to FIG. 2B. However, pressure level information is not displayed on the password authentication screen. Accordingly, even in a case where a third party sees a pattern during the user's operation of the smartphone 106 to unlock it, the third party is unable to see how strongly each dot is being touched. Therefore, the possibility of a password being found out by a third party is reduced and security can be enhanced. Alternatively, in a similar manner to the authentication information setting process, in order to notify the user of a pressure level of a touch operation, the control unit 100 may cause the smartphone 106 to vibrate in accordance with a pressure level when a touch operation is accepted. Since the vibration is not transmitted to a third party not holding the smartphone, the possibility of the third party learning a pressure level is reduced and security can be enhanced.

When a pattern has already been input in a pattern input field, the control unit 100 erases the pattern and initializes the pattern input field (S602).

The control unit 100 determines whether or not input of a pattern has been finished (S603). In a case where a touch off state is detected after detecting a touch on state, input of a pattern is determined to be finished. When input of the pattern has been finished (Yes in S603), the process advances to step S606. When input has not been finished (No in S603), the process advances to step S604.

In order to perform unlocking, for example, the user performs a touch operation by tracing dots displayed on the screen 210 so as to draw a broken line which consecutively passes the dots in an order of 212→213→214→215. In doing so, the user performs an operation on each dot of touching the dot while applying desired pressure (S604). Each time a touch operation passes a dot, the control unit 100 temporarily sequentially stores in the storage unit, as password information, the dot and a pressure level when a touch operation on the dot is performed (S605). A combination of a pattern (positions (coordinates) of dots and a sequence in which the dots have been touched) and a pressure level of the touch operation performed on each dot as indicated by the information stored in step S605 is compared with the password information conclusively registered in the storage unit 101 (S606). When the input combination of the pattern and pressure levels matches the stored password information (Yes in S606), the control unit 100 unlocks the smartphone 106 and allows functions included in the smartphone 106 to be executed (S607). As described above, the control unit 100 determines whether or not a plurality of positions touched by consecutive touch operations, a sequence in which the plurality of positions had been touched, and pressure levels when the respective positions had been touched match the positions, the sequence, and the pressure levels included in the password information. The control unit 100 determines that authentication is successful in a case where these pieces of information match each other.

On the other hand, in a case where the information does not match (No in S606), the control unit 100 performs an unlocking failure process of displaying a message to the effect that password authentication has failed on the touch panel 105 or the like (S607). At this point, a return may be made to step S602 to once again perform a pattern input process. In addition, in a case where authentication fails a prescribed number of times, further input of a pattern may be rejected. Moreover, in a case where a pressure level of each dot does not match but a pattern matches in the input or a pattern, input of a pattern may be continuously accepted even if the number of authentication failures exceeds the prescribed number of times. Furthermore, in a case where a pressure level of each dot does not match but a pattern matches in the input of a pattern, whether an erroneously input pressure level is "high" or "low" may be displayed in step S608. Accordingly, the user can more easily perform a correct input by referring to the pressure level determined upon the erroneous input and adjusting strength of a touch operation on the touch screen accordingly.

According to the present embodiment described above, a combination of a password and a pressure level of a touch operation performed in order to input each character or a combination of a pattern and a pressure level of touch operations performed in order to input the pattern is used as authentication information. In addition, in accordance with a result of a comparison between conclusively registered authentication information and data input by a touch operation for unlocking and pressure applied to a touch panel by the touch operation, unlocking of an information processing apparatus is selectively executed and execution of functions of the information processing apparatus is allowed. Accordingly, since it is difficult to discern a pressure level during a touch operation by external observation, even in a case where a third party looks into a screen of a smartphone during a user's operation for unlocking the smartphone, the third party cannot determine the pressure level. In other words, in the present embodiment, a smartphone is not unlocked in a case where only a character string of a password or coordinates and a sequence of a pattern match registered authentication information. A smartphone is unlocked only in a case where a character string of a password or coordinates and a sequence of a pattern as well as pressure levels respectively associated with the character string and the pattern match the registered authentication information. Therefore, a possibility that a third party manages to unlock a device can be reduced significantly and security of the device can be enhanced. Furthermore, for a legitimate user, since the number of characters constituting a password or the number of dots constituting a pattern is not increased, the hassle of performing operations are reduced and convenience is improved.

(Second Embodiment)

The second embodiment differs from the first embodiment in a method of determining a pressure level. Other processes are similar to those of the first embodiment and descriptions thereof will be omitted.

While a pressure level is determined based on a comparison with a prescribed reference value (fixed value) in the first embodiment, the second embodiment differs from the first embodiment in that a reference value used to determine a pressure level is calculated based on a measurement value measured by the detecting unit 102.

When the user performs a touch operation on the touch panel 105 in order to input authentication information (numerals, alphabetical characters, symbols, a pattern, or the like), the control unit 100 always stores in the storage unit 101 a measurement value measured by the detecting unit 102. In addition, in a case where a series of touch operations for inputting authentication information is finished, a pressure level of a touch operation is relatively determined based on a stored measurement value. A description will now be given with reference to FIG. 3B.

Figure 3B:
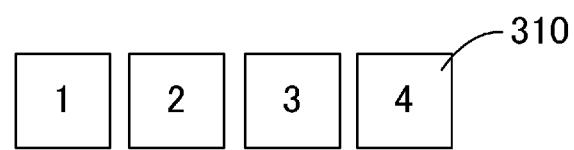
Figure 3B:
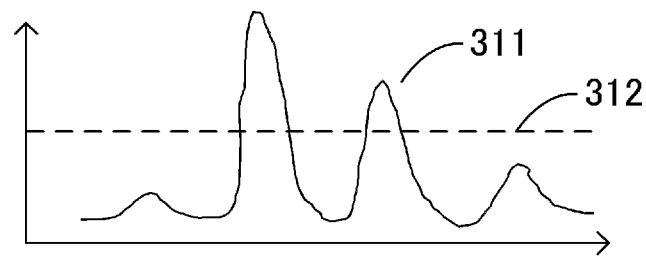

A curved line 311 shown in FIG. 3B is a graph indicating a change in measurement values measured by the detecting unit 102 during the input of a four-digit password. During input of the password, each time one character is input, the control unit 100 acquires a maximum value of measurement values during a period from the start of a touch operation until a finger detaches from the touch panel 105 and stores the maximum value in the storage unit 101. Upon end of the input of the characters of four digits, the control unit 100 calculates an average value of maximum values (stored in the storage unit 101) of measurement values during touch input of the respective characters and adopts the average value as a reference value. A dashed line 312 shown in FIG. 3B indicates a reference value calculated in this manner. The control unit 100 determines whether a pressure level is high or low based on a comparison with a reference value determined in this manner. As described above, in the second embodiment, the control unit 100 relatively determines a pressure level based on measurement values of pressure applied during actual touch operations during the input of a four-digit password. For example, in a case where a password is shared in different devices, pressure applied during touch operations may conceivably increase or decrease as a whole due to a difference in sizes of the devices. Even in such cases, since a magnitude of pressure is relatively determined, a situation where a password is determined to be a mismatch against the intentions of a user can be suppressed and convenience can be improved.

Moreover, in the case of a pattern, in a case where input of the pattern is finished, an average value of maximum values of measurement values of touch operations performed on respective dots constituting the pattern is calculated and adopted as a reference value.

(Third Embodiment)

As a third embodiment, an embodiment in which a password including a pressure level is managed by a server will be described.

Figure 4:
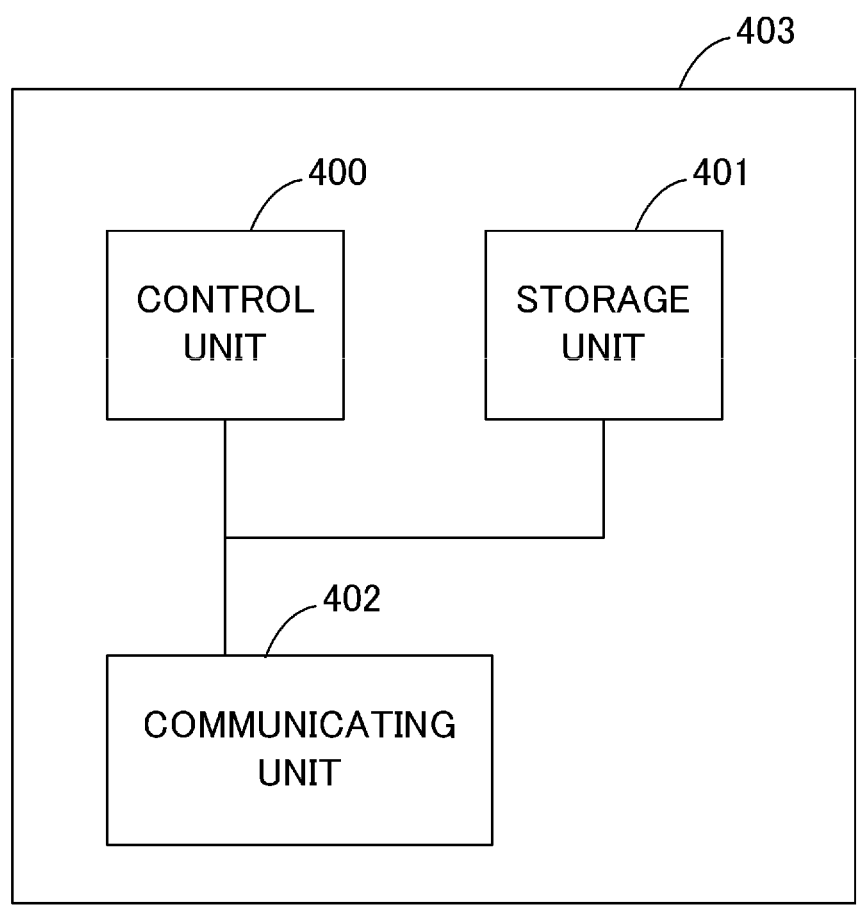
FIG. 4 is a diagram showing an example of a configuration of a server apparatus according to the embodiment of the present invention.

A server apparatus which manages a combination of a password and a pressure level corresponding to each character constituting the password or a combination of a pattern and a pressure level corresponding to a position of each dot as authentication information will now be described using FIG. 4. A control unit 400 is a central processing unit (CPU) which controls operations of an entire server 403. A storage unit 401 is a memory for storing authentication information. Authentication information including a pressure level is input from an external device such as a smartphone via a communicating unit 402. The communicating unit 402 communicates with the external device such as a smartphone or a tablet PC. The storage unit 401 stores authentication information including a pressure level acquired from the external device such as a smartphone.

The external device such as a smartphone issues a transmission request for authentication information to be used in an unlocking process of the device to the server 403. After the communicating unit 402 receives the transmission request for authentication information from the external device, the control unit 400 makes an inquiry to the external device via the communicating unit 402 as to whether or not the external device includes a function of detecting pressure applied to a touch panel.

After the external device receives the inquiry regarding a presence or an absence of a touch pressure level detecting function from the server 403, the external device sends a response regarding the presence or the absence of the function to the server 403. After the control unit 400 of the server 403 receives information on the presence or the absence of the touch pressure level detecting function in the external device via the communicating unit 402, the control unit 400 generates authentication information in accordance with the presence or the absence of the touch pressure level detecting function and transmits the authentication information to the external device.

In a case where the external device includes the touch pressure level detecting function which corresponds to the detecting unit 102 described in the first embodiment, the control unit 400 of the server 403 transmits, via the communicating unit 402, authentication information including a pressure level read from the storage unit 401 to the external device. The external device performs an unlocking process similar to that described in the first embodiment using the authentication information including the pressure level received (acquired) from the server 403. Specifically, in a case where characters of a password (or a pattern constituted by touch positions and a sequence) input by a user matches authentication information and a pressure level during a touch operation of each character (or each touch position) match, a determination is made that authentication is successful and the external device is unlocked.

On the other hand, in a case where the external device does not include a function of detecting touch pressure which corresponds to the detecting unit 102 described earlier, the control unit 400 of the server 403 deletes a pressure level from authentication information to generate authentication information for transmission and temporarily stores the authentication information for transmission in the storage unit 401. In addition, the control unit 400 reads the authentication information not including a pressure level from the storage unit 401 and transmits the authentication information not including a pressure level to the external device via the communicating unit 402.

With the process according to the third embodiment, in a system which manages authentication information used to unlock a device by storing the authentication information in a server (cloud), an unlocking process can be preferably performed even in a case where there is a difference in pressure detecting functions between a plurality of devices. With the system according to the third embodiment, in a case where a device includes a pressure detecting function, robust security can be realized since authentication information combining pressure level information and information on a character (or a pattern constituted by touch positions and a sequence) is used. Meanwhile, in a case where a device does not include a pressure detecting function, authentication information similar to conventional authentication information using only information on a character (or a pattern constituted by touch positions and a sequence) is used. Therefore, a user can use common authentication information shared by a plurality of devices without any regard to the presence or the absence of a pressure detecting function and convenience is improved.

A system constituted by the server 403 described in the third embodiment and the smartphone 106 described in the first and second embodiments also falls within the scope of the present invention.

While examples in which the present invention is applied to a smartphone have been described in the respective embodiments presented above, an information processing apparatus to which the present invention is applicable is not limited to a smartphone. The present invention is applicable to all devices which include a touch panel and a sensor for detecting touch pressure and which perform input of authentication information for unlocking the device by a touch operation. Examples of such devices include a tablet, a personal computer, a media player, a vehicle-mounted apparatus such as a car navigation system including a touch panel, a game device, and a home electric appliance including a touch panel-type operating interface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. It will of course be understood that this invention has been described above by way of example only, and that modifications of detail can be made within the scope of this invention.

This application claims the benefit of Japanese Patent Application No. 2016-081074, filed on Apr. 14, 2016, which is hereby incorporated by reference herein in its entirety.

What is claimed is:

1. An information processing apparatus, comprising:
a processor, and memory storing a computer program which, when executed by the processor of the image processing apparatus, causes the processor to function as:
a display control unit configured to control to perform displaying data on a display device having a touch screen;
a detecting unit configured to detect a position and pressure of a touch operation on the touch screen displaying an input field including at least one of a plurality of characters and a plurality of indicators;
a notifying unit configured to notify a user of information indicating a magnitude of the detected pressure of a setting touch operation for inputting data by displaying the information on the display device while the authentication information is being set, and not to notify a user of information indicating a magnitude of the detected pressure of a login touch operation while authentication process using the authentication information is being performed;
an acquiring unit configured to acquire the set authentication information including a combination of data and information on pressure applied to the touch screen by the setting touch operation for inputting the data;
a comparing unit configured compare the acquired authentication information with a combination of data displayed at a position on the input field of the login touch operation detected by the detecting unit and information on pressure applied to the touch screen by the login touch operation, when the authentication process is performed; and
an execution control unit configured to control to selectively allow execution of functions in accordance with a result of the comparison.

2. The information processing apparatus according to claim 1, wherein
the data included in the authentication information indicates a character,
the display control unit is configured to control to perform displaying a virtual keyboard on the input field on the display device, and
the comparing unit is configured to compare
a combination of a character included in the authentication information and information on pressure applied to the touch screen corresponding to the character, with
a combination of a character of the virtual keyboard displayed at a position of the login touch operation detected by the detecting unit and information on pressure applied to the touch screen by the login touch operation.

3. The information processing apparatus according to claim 1, wherein
the data included in the authentication information indicates a pattern,
the display control unit is configured to control to perform displaying the plurality of indicators on the input field on the display device, and
the comparing unit is configured to compare
a combination of indicators corresponding to the pattern included in the authentication information, a sequence of the indicators, and information on pressure applied to the touch screen corresponding to the indicators, with
a combination of indicators corresponding to positions of a series of login touch operations detected by the detecting unit and information on pressure applied by the login touch operations to the touch screen at positions where the indicators are displayed.

4. The information processing apparatus according to claim 1, wherein as a result of a comparison by the comparing unit, in a case where
the acquired authentication information and
the combination of data displayed at a position of a login touch operation detected by the detecting unit and information on pressure applied to the touch screen by the login touch operation do not match each other, the execution control unit is configured to not allow execution of the functions.

5. The information processing apparatus according to claim 1, wherein as a result of a comparison by the comparing unit, in a case where
the acquired authentication information and
the combination of data displayed at a position of a login touch operation detected by the detecting unit and information on pressure applied to the touch screen by the login touch operation do not match each other, the display control unit is further configured to control to perform displaying information indicating a magnitude of pressure applied to the touch screen by the login touch operation detected by the detecting unit.

6. The information processing apparatus according to claim 1, wherein the authentication information further includes additional data with a larger data amount than the data combined with pressure information in the authentication information, and wherein
as a result of the comparison by the comparing unit, in a case where
the acquired authentication information and
the combination of data displayed at a position of a login touch operation detected by the detecting unit and information on pressure applied to the touch screen by the login touch operation do not match each other, the detecting unit is further configured to detect a position of a new touch operation performed on the touch screen displaying the input field,
the comparing unit is further configured to compare the additional data included in the authentication information with data displayed at a position of the new touch operation detected by the detecting unit, and
the execution control unit is configured to selectively allow execution of the functions in accordance with a result of the comparison.

7. The information processing apparatus according to claim 1, wherein the detecting unit is configured to measure pressure applied to the touch screen by the touch operation, and information on pressure applied to the touch screen by the touch operation is expressed in terms of a degree based on a comparison between the measured value and a prescribed reference value.

8. The information processing apparatus according to claim 1, further comprising:
a storage unit configured to store the authentication information input by the setting touch operation, wherein
the acquiring unit is configured to acquire the authentication information from the storage unit.

9. The information processing apparatus according to claim 8, wherein the notifying unit is configured, when pressure applied to the touch screen by the setting touch operation for inputting the authentication information is detected by the detecting unit, to control to perform displaying on the display device information indicating a magnitude of pressure applied to the touch screen by the setting touch operation.

10. The information processing apparatus according to claim 1, wherein the acquiring unit is configured to acquire the authentication information from an external server apparatus.

11. The information processing apparatus according to claim 1, wherein the input field is selected based on an authentication mode including a character mode and a pattern mode.

12. The information processing apparatus according to claim 11, wherein in the character mode, the input field includes a virtual keyboard including the plurality of characters; and
a combination of characters included in the virtual keyboard on the touch screen is detected and compared with the acquired authentication information.

13. The information processing apparatus according to claim 11, wherein in the pattern mode, the input field includes a pattern input field including the plurality of indicators; and
a sequence in which each indicator is touched by the touch operation is detected and compared with the acquired authentication information.

14. A control method for an information processing apparatus, the method comprising the steps of:
controlling to perform displaying data on a display device having a touch screen;
detecting a position and pressure of a touch operation on the touch screen displaying an input field including at least one of a plurality of characters and a plurality of indicators;
notifying a user of information indicating magnitude the detected pressure of a setting touch operation for inputting data by displaying the information on the display device while the authentication information is being set, and not to notify a user of information indicating a magnitude of the detected pressure of a login touch operation while authentication process using the authentication information being performed;
acquiring the set authentication information including a combination of data and information on pressure applied to the touch screen by the setting touch operation for inputting the data;
comparing the acquired authentication information with a combination of data displayed at a detected position on the input field of the login touch operation and information on pressure applied to the touch screen by the login touch operation, when the authentication process is performed; and
performing control to selectively allow execution of functions in accordance with a result of the comparison.

15. A non-transitory computer-readable storage medium storing a program which, when executed by a computer, cause the computer to function as an information processing apparatus including:
a display control unit configured to control to perform displaying data on a display device having a touch screen;
a detecting unit configured to detect a position and pressure of a touch operation on the touch screen displaying an input field including at least one of a plurality of characters and a plurality of indicators;
a notifying unit configured to notify a user of information indicating a magnitude of the detected pressure of a setting touch operation for inputting data by displaying the information on the display device while t e authentication information is being set, and not to notify a user of information indicating a magnitude of the detected pressure of a login touch operation while authentication process using the authentication information is being performed;
an acquiring unit configured to acquire the set authentication information including a combination of data and information on pressure applied to the touch screen by the setting touch operation for inputting the data;
a comparing unit configured to compare the acquired authentication information with a combination of data displayed at a position on the input field of the login touch operation detected by the detecting unit and information on pressure applied to the touch screen by the login touch operation, when the authentication process is performed; and
an execution control unit configured to control to selectively allow execution of functions in accordance with a result of the comparison.

* * * * *